United States Patent [19]

Zellmer

[11] 4,263,645
[45] Apr. 21, 1981

[54] SELF-STARTING CARRIER SUBSCRIBER POWER SUPPLY

[75] Inventor: Neale A. Zellmer, Belmont, Calif.

[73] Assignee: GTE Automatic Electric Laboratories, Inc., Northlake, Ill.

[21] Appl. No.: 35,029

[22] Filed: Apr. 30, 1979

[51] Int. Cl.³ .......................................... H02M 7/00
[52] U.S. Cl. ..................................................... 363/49
[58] Field of Search .................................... 363/49, 41

[56] References Cited

U.S. PATENT DOCUMENTS

| | | |
|---|---|---|
| 3,085,211 | 4/1963 | Jensen et al. . |
| 3,506,904 | 4/1970 | Sikorra ............................. 363/49 X |
| 3,527,999 | 9/1970 | Weinberger . |
| 4,063,307 | 12/1977 | Stephens ........................... 363/49 X |
| 4,215,392 | 7/1980 | Rhoads .............................. 363/41 X |

OTHER PUBLICATIONS

"Inverter Start Circuit", W. S. Duspiva and C. J. Palmucci, IBM Technical Disclosure Bulletin, vol. 14, No. 4, Sep. 1971, p. 1239.
"Switching Regulator Start-Up Circuit", C. J. Palmucci, IBM Technical Disclosure Bulletin, vol. 19, No. 3, Aug. 1976, pp. 978-979.
"Packaged Pulse-Width Modulator Simplifies Series-Switching Regulator Design", John Svalbe, Electronics Design 19, Sep. 14, 1972, p. 162.
"Constant Period with Variable Duty Cycle Obtained from 555 With Single Control", Robert W. Hilshu, Electronics Design 14, Jul. 5, 1975, p. 72.
"DC-to-DC Converter Uses IC Timer", Robert Solomon and Robert Broadway, Electronic Design News, Sep. 5, 1973, pp. 87-91.
"Switching Supply Converts −60V to +5V and ±6.3V with 83% Efficiency", Philip M. Cowett, Electronic Design 2, Jan. 18, 1978, p. 106.

*Primary Examiner*—William M. Shoop
*Attorney, Agent, or Firm*—Russell A. Cannon

[57] ABSTRACT

A power supply in carrier subscriber terminal equipment includes a switched DC-to-DC converter that is powered by a DC line voltage and driven by a pulse width modulator for producing a first DC voltage on a bus line that powers the modulator and an oscillator which keys the modulator. Circuitry for starting the converter, modulator, and oscillator includes a first transistor and Zener diode that are resistively connected in series across the line voltage for producing a second DC voltage on the Zener, which is less than the first voltage. A second transistor is turned on by the second DC voltage for coupling it to the bus line to initially energize the oscillator and modulator, which then drives the converter to cause it to produce the first voltage on the bus line. A second output of the oscillator is also coupled through a voltage doubler to the first transistor for turning it and the Zener off. A third transistor is responsive to conduction of the second transistor for clamping the second output of the oscillator to approximately ground for blocking it from the first transistor until the converter produces the first voltage on the bus line, which reverse biases the base-emitter junction of the second transistor for cutting it and the third transistor off to make it possible for the first transistor and Zener diode, and thus the starter circuit, to be turned off.

7 Claims, 1 Drawing Figure

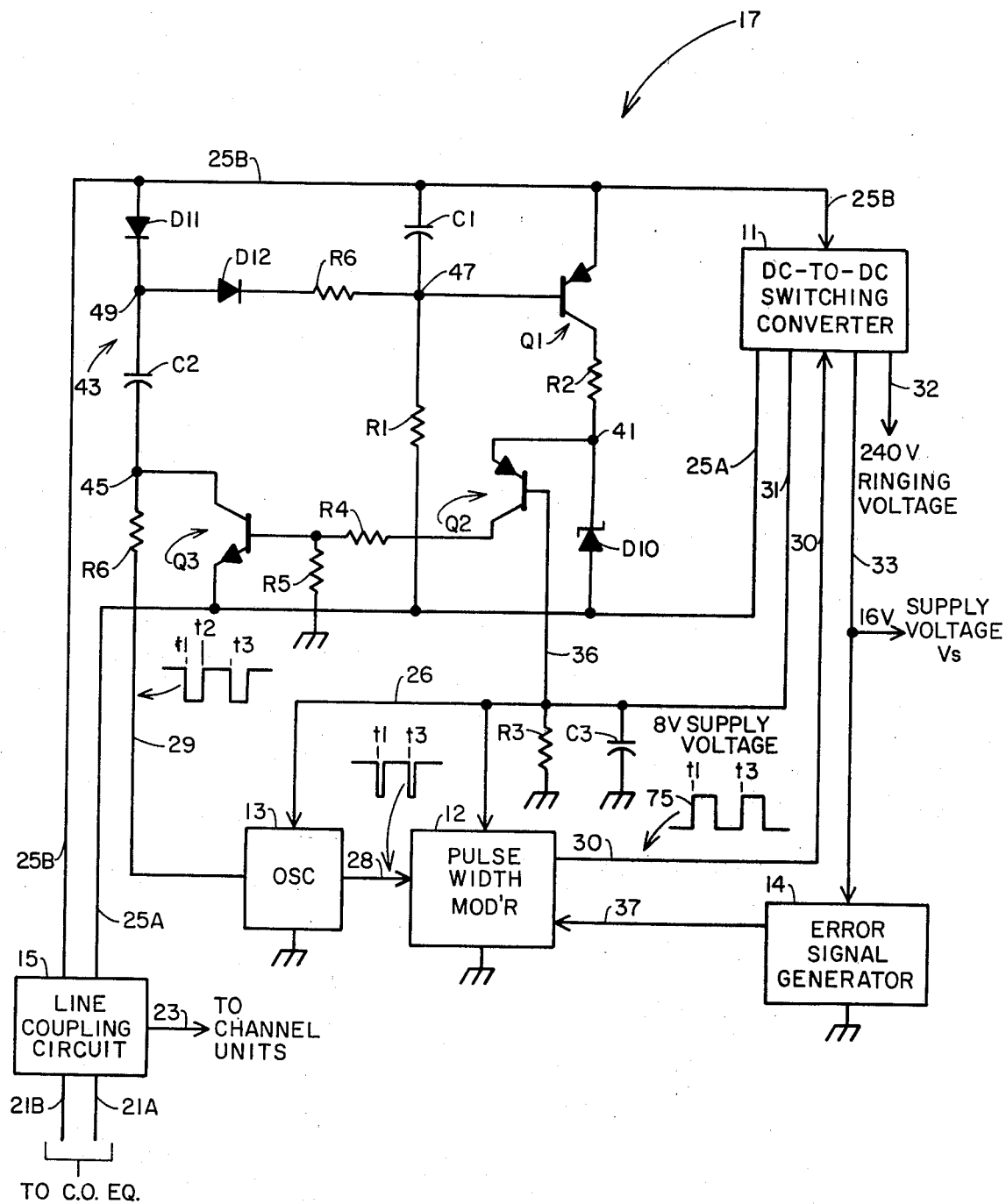

SELF-STARTING CARRIER SUBSCRIBER POWER SUPPLY

BACKGROUND OF INVENTION

This invention relates to a power supply for subscriber terminal equipment in a carrier subscriber telephone system, and more particularly to a starter circuit for firmly establishing operation of electrical circuitry including a DC-to-DC converter and oscillator means prior to the starter circuit being disabled for reducing power dissipation in the power supply.

The power supply in the subscriber station terminal of a carrier subscriber telephone system may comprise a switched DC-to-DC converter providing an 8-volt DC supply voltage for powering an oscillator that keys a pulse width modulator for causing it to drive the converter, a 250 volt DC supply voltage that is chopped for producing a ringing signal, and a 16 volt DC supply voltage that powers a subscriber channel unit. The power supply is connected to the carrier line and powered by line current from central office battery equipment. A starter circuit is required to ensure that the power supply starts operating when it is first connected to the line. In order to provide maximum output power to the subscriber terminal equipment connected to the power supply, it is necessary to disable the starter circuit once the power supply is operating satisfactorily. It is also necessary to ensure that operation of the power supply is firmly established before the starter circuitry is turned off. In a simple starter circuit, both a voltage divider and the series combination of a Zener diode and the emitter-collector path of a transistor are electrically connected across the input lines with the divider tap voltage applied to the transistor base electrode for turning the transistor and Zener on to establish a collector voltage that initially powers the oscillator and modulator. An output of the oscillator is applied to the transistor base electrode for turning off the starter circuit. Such a starter circuit was found ineffective since it resulted in a spurious operation mode in which the starter turned on intermittently and operation of the rest of the power supply was never fully established. Prior art starter circuits are shown in U.S. Pat. Nos. 3,085,211, Apr. 9, 1963, Converter With Active Starter Circuit, by J. L. Jensen et al and U.S. Pat. No. 3,527,999, Sept. 8, 1970, Switching-Type Voltage Regulator Controlled by Integrating Circuit by A. D. Winberger.

An object of this invention is the provision of a starter circuit that is maintained operative for producing a constant DC output voltage until operation of external circuitry is firmly established.

SUMMARY OF INVENTION

In accordance with this invention, apparatus for starting electrical circuitry including a DC-to-DC converter that is powered by a DC input voltage and driven by oscillator means for producing a first DC voltage on a bus line that energizes the oscillator means comprises: first switch means and a Zener diode resistively electrically connected in series across a pair of terminals receiving the DC input voltage for operating to establish a second DC voltage, which is less than the first voltage, on the diode; second switch means which is closed by the second voltage on the diode for coupling it to the bus line for energizing the oscillator means to cause it to drive the converter into operation so as to firmly establish the first DC voltage on the bus line; control means that may be responsive to an alternating output signal from the oscillator means for opening the first switch means which disables the Zener diode and removes the second voltage therefrom; and third switch means responsive to the second means being closed for disabling the control means so that the first switch means remains closed; the first voltage on the bus opening the second switch means which opens the third switch means so that the control means is responsive to the output of the oscillator means for opening the first switch means and turning off the starter apparatus.

DESCRIPTION OF DRAWING

This invention will be more fully understood from the following detailed description of preferred embodiments thereof, taken together with the single FIGURE of drawing which is a schematic circuit and block diagram of a carrier subscriber power supply including a starter circuit 17 embodying this invention.

DESCRIPTION OF PREFERRED EMBODIMENTS

The power supply in the drawing is essentially a constant frequency switching regulator located at the subscriber station terminal end of a carrier subscriber telephone system. Such a power supply requires that the length of an energy storing state be shortened or lengthened as the load connected to the power supply decreases or increases, respectively. This power supply comprises a variable duty cycle DC-to-DC switching converter 11 that is driven by a pulse width modulator 12 for controlling its duty cycle; a fixed frequency oscillator 13 producing clock pulses for keying the pulse width modulator; an error signal generator 14 that controls the operation of the pulse width modulator for varying the width of pulses therefrom, and thus the duty cycle of the converter, in order to regulate signal voltages produced by it; a starter circuit 17; and a line coupling circuit 15. The modulator 12, oscillator 13, and error generator 14 comprise a control circuit in a feed back loop including the converter 11. The circuits 11–15, other than the starter circuit 17, are conventional.

The input to circuit 15 is connected directly to cable pair wires 21A and 21B supporting carrier signals and a DC line voltage from central office battery equipment (not shown). The circuit 15 essentially comprises a line terminating network for coupling the carrier signal on lines 21A and 21B to and from a carrier bus line 23 that is connected to a channel unit, and a line filter passing only the central office battery voltage to a voltage regulator that converts the central office battery voltage (which may vary from 120 to 250 volts on lines 21A and 21B) to a relatively constant 120 to 140 volt DC input voltage on lines 25A and 25B. Modulator 12 and oscillator 13 are energized by a DC supply voltage of approximately 7 volts on a bus 26. Such a bus voltage causes the oscillator to produce fixed frequency clock pulses on line 28 that key the modulator for fixing the times that pulses are generated on line 30. Pulse width modulators are described in the articles "Packaged Pulse-Width Modulator Simplifies Series-Switching Regulator Design" by John Svalbe, Electronic Design 19, Sept. 14, 1972, page 162, and "Constant Period With Variable Duty Cycle Obtained From 555 With Single Control," by Robert W. Hilshu, Electronic Design 14, July 5, 1975, page 72. The oscillator also produces a buffered pulse output signal of the opposite sense on line 29.

The converter 11 is responsive to pulses on line 30 for producing prescribed DC output signal voltages on lines 31–33. The converter may be a shunt-swinging choke-type switching converter, including a transformer having a plurality of secondary windings connected to associated rectifiers and regulators for producing the prescribed signal voltages. This type switching converter is described in the articles "DC-to-DC Converter Uses IC Timer" by Robert Solomon and Robert Broadway, Electronic Design News, Sept. 5, 1973, pages 87–91, and "Switching Supply Converts −60 V to +5 V and ±6.3 V With 83% Efficency" by Philip M. Cowett, Electronic Design 2, Jan. 18, 1978, page 106. The 8 volt DC supply voltage on line 31 is connected to bus 26 for powering the oscillator and modulator. The constant 240 volt DC ringing voltage on line 32 is applied to a channel unit where it is chopped to provide a ringing signal for driving ringers of subscriber handsets. The constant 16 volt DC signal voltage on line 33 is the supply voltage for powering the external channel units. Since the level of this voltage on line 33 will vary depending on the load connected to the power supply, the generator circuit 14 compares the voltage on line 33 with an internally generated reference voltage for producing an error voltage on line 37. The circuit 12 may comprise a voltage divider connected between line 33 and ground, with the tap point sensing changes in $V_s$ and connected to the base of a transistor that has its emitter connected to ground through a Zener diode that establishes the reference voltage and to line 33 through a resistor. The error voltage is coupled from the transistors collector which is resistively coupled to line 33. This error voltage biases modulator 12 for changing the width of voltage pulses so as to vary the duty cycle of converter 11 in the conventional manner for maintaining the output voltage on line 33 substantially constant. The power supply may also include circuitry (not shown) for limiting the maximum duty cycle of converter 11 so as to limit the magnitude of central office current drawn on lines 21A and 21B by the power supply.

Reference to the drawing reveals that when the converter is connected to the DC input voltage on lines 25A and 25B it will not produce the requisite 8 volt supply potential on line 31 and bus 26 unless the oscillator and modulator are operating to produce voltage pulses on line 30 that drive the converter. In accordance with this invention, the starter circuit 17 operates to provide a constant DC voltage on line 36, and thus bus 26, for energizing the oscillator and modulator for producing voltage pulses that drive the converter long enough to firmly turn it and the oscillator and modulator on prior to the starter circuit being disabled for conserving energy and reducing the power drawn from the lines 21A and 21B.

The starter circuit 17 comprises a first switching transistor Q1 and a 7.5 volt Zener diode D10 that conduct when they are connected across input lines 25A and 25B; a second transistor switch Q2 whose emitter-base junction conducts to couple the Zener voltage on node 41 to bus 26; a voltage doubler 43 comprising diodes D11 and D12, and capacitors C1 and C2 that may be responsive to the output of the oscillator on line 29 for cutting off Q1 and thus the Zener; and a third transistor switch Q3 that operates for briefly inhibiting the buffered output of the oscillator on line 29 turning off Q1 and D10 until operation of the oscillator, modulator, and converter is firmly established.

Consider that a DC input voltage of approximately 140 V is developed on lines 25A and 25B when the power supply is initially connected to the cable pair wires 21A and 21B. This DC potential on lines 25A and 25B forward biases the Q1 base-emitter junction so that it conducts base current through bias resistor R1 and collector current through current-limiting resistor R2 and D10. This operation rapidly drives Q1 into saturation, causing a charge voltage of approximately 0.6 volt to be developed on C1 and a potential of 139.4 volts at node 47. Since the input voltage on lines 25A and 25B is greater than the 7.5 volt Zener voltage at this time, a 7.5 volt signal potential is produced at node 41 which forward biases the Q2 base-emitter junction for turning on Q2 and driving it into saturation. This conduction of Q2 causes it to pass a base current in line 36 and R3 and filter capacitor C3 that establishes a DC start-up voltage of approximately 7 volts on bus 26. This start-up voltage on the bus energizes the oscillator and modulator for producing clock pulses on line 28 that key modulator 12 so that it produces the voltage pulses 75 on line 30 that drive the converter.

Conduction of Q2 through R4 and R5 also forward biases the base-emitter junction of Q3 for causing it to conduct through diode D11, capacitor C2, and its collector-emitter path and to operate in saturation. This operation of Q3 clamps node 45 to approximately ground potential to inhibit transmission of the output of the oscillator on line 29 to node 49 so that it will not turn off Q1 and thus the starter circuit until the converter causes the line 31 voltage to rise high enough to assure satisfactory operation of the control circuit as is described more fully hereinafter. Conduction of Q3 through D11 also causes a charge voltage of approximately 139 volts to be developed on C2. Since there is one junction voltage drop between line 25B and the two nodes 47 and 49, D12 is cut off at this time and C1 charges to approximately 0.6 volt so that Q1 continues to conduct.

When the converter 11 is driven by the modulator long enough to produce a constant 8 volt DC signal potential on the output line 31 and bus 26, the base-emitter junction of Q2 is reverse-biased and Q2 turns off. The resultant interruption of Q2 collector current cuts off Q3, thereby unloading node 45 so that the potential there can rise. When the oscillator 13 produces the next 7 volt pulse signal at its buffered output on line 29, the voltage at node 45 rises by 7 volts causing the 139 volt charge voltage on C2 to raise the node 49 potential to approximately 146 volts. This causes D11 to be cut off and D12 to conduct so that C1 charges to approximately 5 volts above the bus 25B potential. This voltage at node 47 cuts off Q1 and thus the Zener D10. The time constant R1C1 is sufficient to hold Q1 off as long as the oscillator continues operating. When the signal voltage on line 29 drops to its low value, D12 is cut off and D11 conducts for recharging C2 to approximately 139.4 volts. During this time interval, C1 discharges slowly through R1 to be recharged on each positive half cycle on bus 29. This action continues during established operation of the power supply. This operation of the starter circuit reduces power dissipation in it and ensures that maximum line current is converted to useful power that can be delivered to a load by the power supply.

Although this invention is described in relation to a preferred embodiment thereof, variations and modifications will occur to those skilled in the art without departing from the spirit of this invention. By way of example, the starter circuit 17 is applicable to electrical circuitry other than a power supply in a carrier subscriber telephone system. Also, Q1 and D11 may be replaced by a Darlington compound and a pair of series-connected diodes, respectively, for providing increased DC gain in the transistors so that R1 may have a large resistance and pass a smaller bias current. Further, the reference voltage at node 41 may be provided by a voltage divider type circuit. Also, the turn-off circuit 43 may be a full-wave or half-wave rectifier type circuit that transfers energy to a storage capacitor that holds Q6 cut off. Additionally, R3 and C3 may be elements of the oscillator or modulator. The scope of this invention is therefore to be determined from the attached claims rather than the detailed description of preferred embodiments here.

What is claimed is:

1. In combination with power supply circuitry including DC-to-DC converter means for producing a first relatively constant DC voltage on a bus for powering an oscillator means thereof which drives the convertor means, starter apparatus responsive to application of a DC input voltage to it and the converter means for firmly turning on the circuitry, said apparatus comprising:
   first means responsive to a DC input voltage that is applied to input terminals and which is greater than a prescribed value for operating in a conduction state for establishing a second DC voltage, that is less than the first voltage at a node thereof,
   second means, which is a switch means, responsive to the second voltage for operating in a closed state for coupling the second voltage to the bus for energizing the oscillator means for causing it to drive the converter means into operation so as to produce the first DC voltage on the bus,
   thirds means responsive to an output signal of the oscillator means when it is energized for causing said first means to operate in a non-conduction state for removing the second DC voltage from said node thereof, and
   fourth means responsive to operation of said second means in the closed state for disabling said third means so that said first means continues to operate in the conduction state, establishment of the first voltage on the bus by the converter means opening said second means for disabling said fourth means which then enables said third means to cause said first means to operate in a non-conduction state to turn off the starter apparatus.

2. Apparatus according to claim 1 wherein said first means comprises the series combination of fifth means which is a switch means, and an active element resistively electrically connected across the input terminals, said active element conducting for establishing the second voltage across it when said fifth means is closed and the input voltage is greater than the second voltage.

3. Apparatus according to claim 2 wherein said second means comprises a first transistor having a base-emitter junction electrically connected between said active element and the bus, and having a collector electrically connected to one of the input terminals, said first transistor conducting for coupling a DC voltage substantially equal to the second voltage to the bus when said fifth means is closed and said active element is conducting.

4. Apparatus according to claim 3 wherein said fourth means comprises a second transistor having a base-emitter junction electrically connected between the collector of said first transistor and the one input terminal, and having a collector electrode electrically connected to said third means and to the output of the oscillator means, said second transistor being saturated when said first transistor conducts for preventing the output signal of the oscillator means affecting the operation of the starter circuit when said first and second transistors are conducting.

5. Apparatus according to claim 4 wherein said fifth means comprise a third transistor having an emitter-collector path electrically connected in series with said active element which is a Zener diode, and bias means electrically connected across the input terminals and having a node electrically connected to the control electrode of said third transistor for biasing it to establish conduction thereof when the DC input voltage is applied to the input terminals.

6. Apparatus according to claim 5 wherein said third means comprises a voltage doubler circuit including capacitive storage means responsive to a pulsating output of the oscillator means for maintaining said third transistor cut off and the starter apparatus inoperative when the oscillator means is operative and the first voltage is present on the bus for cutting off said first and second transistors.

7. Apparatus according to claim 5 wherein said third means comprises first diode means and first capacitive storage means electrically connected in series between the other input terminal and the collector of said second transistor, second diode means electrically connecting the junction of said first diode means and first capacitor storage means to the control electrode of said third transistor, and second capacitor storage means electrically connected between the control electrode of said third transistor and said other input terminal, said diode and capacitive storage means being responsive to a pulsating output of the oscillator means for maintaining said third transistor cut off and the starter apparatus inoperative when the oscillator means is operative and the first voltage is present on the bus for cutting off said first and second transistors.

* * * * *